US00RE38280E

(19) United States
(12) Reissued Patent
Althaus et al.

(10) Patent Number: US RE38,280 E
(45) Date of Reissued Patent: Oct. 21, 2003

(54) OPTOELECTRONIC MODULE FOR BIDIRECTIONAL OPTICAL DATA TRANSMISSION

(75) Inventors: Hans-Ludwig Althaus, Lappersdorf (DE); Wolfgang Gramann, Regensburg (DE); Wolfgang Reill, Pentling (DE); Werner Spath, Holzkirchen (DE)

(73) Assignee: Infineon Technologies AG, Munich (DE)

(21) Appl. No.: 09/785,346

(22) Filed: Feb. 16, 2001

Related U.S. Patent Documents

Reissue of:
(64) Patent No.: 6,097,521
Issued: Aug. 1, 2000
Appl. No.: 09/281,816
Filed: Mar. 30, 1999

U.S. Applications:
(63) Continuation of application No. PCT/DE97/02224, filed on Sep. 26, 1997.

(30) Foreign Application Priority Data

Sep. 30, 1996 (DE) ..... 196 40 421

(51) Int. Cl.[7] ..... G02B 27/14; H04B 10/00
(52) U.S. Cl. ..... 359/629; 359/143; 359/154; 359/618; 359/152; 385/31
(58) Field of Search ..... 359/143, 152, 359/154, 155, 127, 129, 131, 618, 629, 634, 638–640, 589, 833, 900; 385/33, 31, 36

(56) References Cited

U.S. PATENT DOCUMENTS 4,358,676 A * 11/1982 Childs et al.
6,021,238 A * 2/2000 Spaeth ..... 385/31
6,055,110 A * 4/2000 Kintz et al. ..... 359/637

FOREIGN PATENT DOCUMENTS

DE 33 24 611 A1 * 1/1985
DE 34 45 751 C2 * 6/1987
DE 41 36 893 A1 * 5/1993
EP 0 120 457 A2 * 10/1984
EP 0 199 565 A2 * 10/1986
EP 0 397 911 A1 * 11/1990
EP 0 600 426 A2 * 6/1994
EP 0 664 585 A1 * 7/1995

OTHER PUBLICATIONS

Japanese Patent Abstracts No. 02213189 (Kazuyoshi), dated Aug. 24, 1990.*

IBM Technical Bulletin: "Planar Photodiode Technology for Optical Interconnects", vol. 36, No. 8, Aug. 1993.*

* cited by examiner

*Primary Examiner*—James Phan
(74) *Attorney, Agent, or Firm*—Laurence A. Greenberg; Werner H. Stemer; Ralph E. Locher

(57) ABSTRACT

An optoelectric module for bidirectional optical data transmission has a molded element provided as a beam splitter, which consists essentially of a material that is transparent for the emitted radiation and the received radiation, and in which a beam splitter is embedded. A transmitting component, a receiving component and a radiation focusing device are advantageously directly connected to the molded element.

17 Claims, 4 Drawing Sheets

OPTOELECTRONIC MODULE FOR BIDIRECTIONAL OPTICAL DATA TRANSMISSION

Matter enclosed in heavy brackets [ ] appears in the original patent but forms no part of this reissue specification; matter printed in italics indicates the additions made by reissue.

CROSS-REFERENCE TO RELATED APPLICATION

This is a continuation of copending International Application PCT/DE97/02224, filed Sept. 26, 1997, which designated the United States.

BACKGROUND OF THE INVENTION

Field of the Invention

The invention lies in the optoelectronics field. Specifically, the invention concerns an optoelectronic module for bidirectional optical data transmission, in which a transmitting component to emit radiation, a receiving component to receive radiation, a beam splitter with a beam splitter layer and a radiation focusing to focus the radiation are designed and arranged relative to each other, so that during operation of the optoelectronic module, at least part of a radiation emitted by the transmitting component is input coupled in an optical device, especially an optical waveguide, optically coupled to the optoelectronic module, and that at least part of the received radiation, output coupled from the optical device, is input coupled in the receiving component.

This type of module is known, for example, from European Patent Application EP 664 585. In this document a transmitting and receiving module for bidirectional optical message and signal transmission is described. In this known module a laser chip is arranged on a common support between two support parts, whose side surfaces, adjacent to the resonator surfaces of the laser chip, are provided with mirror layers and are sloped at an angle of 45° to the resonator surfaces. Radiation emitted from the laser chip, parallel to the top of the common support, is diverted from one of these side surfaces by 90° in the direction of a lens coupling optics attached to the support part and input coupled in an optical waveguide by means of this. Radiation output coupled from the optical waveguide, for which the mirror layers and the material of the support parts, as well as the common support, are at least partially transparent, is received by a photodiode arranged beneath the common support. The device, consisting of a laser chip, photodiode, common support and support parts, is incorporated in a hermetically sealed metal housing with a window.

Installation of the individual components of an optical electronic module designed in this way is very complicated. It requires a large number of process steps and adjustment of the individual components relative to each other is difficult. Moreover, large reflection losses occur because of the air gap between the lens and the mirror layer.

SUMMARY OF THE INVENTION

It is accordingly an object of the invention to provide an optoelectronic module, which overcomes the above-mentioned disadvantages of the heretofore-known devices and methods of this general type and which requires the least possible installation expense, permits the simplest possible adjustment of the individual components, and exhibits limited reflection losses.

With the foregoing and other objects in view there is provided, in accordance with the invention, an optoelectronic module for bidirectional optical data transmission, comprising:

a transmitting component emitting radiation;

a receiving component receiving the radiation;

a beam splitter with a beam splitter layer and a radiation focusing device to focus radiation;

said transmitting and receiving components, said beam splitter and said focusing device being and arranged relative to each other, so that during operation of the optoelectronic module, at least one part of the radiation emitted by the transmitting component is input coupled in an optical device optically coupled to the optoelectronic module, and that at least one part of the received radiation output coupled from the optical device is input coupled in the receiving component, characterized by the fact:

that a molded element is prescribed as beam splitter, which consists essentially of a material transparent to the emitted radiation and the received radiation, and in which the beam splitter layer is embedded, that the molded element has at least a first side surface, a second side surface and a third side surface, that the first side surface and the second side surface are sloped toward each other, that the third side surface and the second side surface or the third side surface and the first side surface are sloped toward each other.

that the first side surface and the third side surface or the second side surface and the third side surface are opposite side surfaces of the molded element, that a transmitting component beam output surface of the transmitting component faces the first side surface, that a receiving component beam input surface of the receiving component faces the second side surface, that a beam input and beam output surface of the radiation focusing device faces the third side surface, that the beam splitter layer is arranged so that it intersects both the beam axis of the emitted radiation and the beam axis of the received radiation, and that the transmitting component beam output surface of the transmitting component is connected to the first side surface, the receiving component beam input surface of the receiving component is connected to the second side surface, and the beam input and beam output surface of the radiation focusing device is connected to the third side surface.

According to the invention, a molded element is provided as beam splitter in the optoelectronic module of the type mentioned at the outset, which consists essentially of a material transparent to the emitted radiation and the received radiation and in which the beam splitter layer is embedded. The configuration of the beam splitter according to the invention as a molded element has the particular advantage that its side surfaces can be used as reference and adjustment surfaces for all the components just mentioned of the optoelectronic module.

The molded element has at least a first side surface, a second side surface and a third side surface, in which the first side surface and the second side surface are sloped toward each other, especially perpendicular to each other. The third side surface is sloped to the second side surface or to the first side surface, in particular, has the included angle of 90°. The first and third side surfaces or the second and third side surfaces are the opposite side surfaces of the molded element and lie parallel to each other. A transmitting component radiation output surface of the transmitting component faces the first side surface of the beam splitter device, a receiving component radiation input surface of the receiving component faces the second side surface and a radiation input and radiation output surface of the radiation focusing device faces the third side surface. The beam splitter layer is arranged so that it intersects both the beam axis of the emitted radiation and the beam access of the received radiation.

Transmitting component beam output surface is to be understood to mean that side surface of the transmitting component through which the greatest part of radiation generated in the transmitting component emerges from it. Likewise, receiving component beam input surface means that side surface of the receiving component through which radiation being received by the receiving component is input coupled. The beam input and beam output surface of the radiation focusing device means that side surface of the radiation focusing device through which the radiation emitted by the transmitting component penetrates the radiation focusing device, and through which radiation received by the radiation focusing device from the optical device emerges from the radiation focusing device.

The transmitting component beam output surface is connected to the first side surface, the receiving component beam input surface is connected to the second side surface and the beam input and beam output surface of the radiation focusing device is connected to the third side surface. A radiation-transparent medium, like transparent synthetic resin that fills up any gap present between the individual surfaces, serves as means of connection. It is particularly advantageous if the transmitting component beam output surface has physical contact with the first side surface, i.e., if the spacing between the transmitting component beam output surface and the first side surface is smaller than or equal to one-tenth of the wavelength of the emitted radiation. Ideally, the transmitting component beam output surface lies on the first side surface. The same applies to the receiving component beam input surface and the beam input and beam output surface of the radiation focusing device. An optoelectronic module designed in this way according to the invention advantageously has very limited internal reflection losses.

A particular advantage of the optoelectronic module according to the invention is that is has a very limited space requirement.

In an advantageous modification of the optoelectronic module according to the invention the beam splitter is produced from at least two joined optical prisms and the beam splitter layer is arranged between the two optical prisms. Because of this, a simple and thus cost-effective manufacturing method for large numbers of pieces can be advantageously accomplished for the beam splitter.

In a particularly preferred variant of the optoelectronic module according to the invention, the beam splitter has the shape of a cuboid, the beam splitter layer lies in a diagonal plane of section of the cuboid and a plane of section lying perpendicular to the beam splitter layer has the shape of a rectangle, especially the shape of a square. Such so-called prism-cubes are advantageously particularly simple to produce in large numbers.

In another preferred modification of the optoelectronic module according to the invention the radiation focusing device has a support part, on which the beam splitter and transmitting component are attached. The support part consists essentially of a material, transparent to the emitted radiation and the received radiation, and the transmitting component and radiation focusing device are arranged on opposite sides of the support part. Because of this, the design size of the optoelectronic module, in particular, can be significantly reduced and the radiation losses in the optoelectronic module are further reduced. In a particularly preferred variant of this advantageous modification of the optoelectronic module, the support part is designed in one piece with the radiation focusing device.

Another preferred variant of the optoelectronic module according to the invention has a monitor diode, which has a monitor diode beam input surface facing a fourth side surface of the molded element. Here again, monitor diode beam input surface means that side surface of the monitor diode through which radiation being detected by the monitor diode penetrates it. The first side surface and the fourth side surface of the molded element are arranged so that, during operation of the optoelectronic module, at least part of the emitted radiation passing through the beam splitter encounters the monitor diode beam input surface. For example, they represent opposite side surfaces of the molded element and, in particular, lie parallel to each other. In this case, the second and third side surfaces are also opposite side surfaces of the molded element that are parallel to each other. Advantageously, the monitor diode is also attached to the support part and any gap present between the monitor diode beam input surface and the fourth side surface of the molded element is filled with a transparent material.

A particularly preferred modification of the optoelectronic module according to the invention, in which the molded element has the shape of a cuboid, the beam splitter layer lies in a diagonal plane of section of the cuboid, a plane of section of the cuboid lying perpendicular to the beam splitter layer has the shape of a rectangle, especially a square, and in which the second and third side surfaces are opposite side surfaces of the molded element, so that the radiation focusing device and the receiving component are arranged on opposite sides of the molded element, has the features that the beam axis of the emitted radiation and the beam axis of the received radiation enclose an angle of 90°, that the beam splitter layer is designed and arranged so that it reflects most of the emitted radiation, so that the beam axis of the reflected radiation runs parallel to the beam axis of the received radiation, and that it transmits at least part of the received radiation, so that this encounters the receiving component beam input surface.

Another particularly preferred modification of the optoelectronic module according to the invention, in which the molded element has the shape of a cuboid, the beam splitter layer lies in a diagonal plane of section of the cuboid, a plane of section of the cuboid lying perpendicular to the beam splitter layer has the shape of a rectangle, especially a square, and the first and third side surfaces are opposite side surfaces of the molded element, so that the beam focusing device and the transmitting component are arranged on opposite sides of the molded element, has the features that the beam axis of the emitted radiation and the beam axis of the received radiation run essentially parallel to each other, that the beam splitter layer is designed and arranged so that it transmits a part of the emitted radiation being input coupled in the optical device and mostly reflects the received radiation and diverts it to the receiving component.

It is also particularly advantageous if a blocking filter is arranged between the receiving component and the second side surface of the molded element, which is essentially nontransparent from the wavelength of the emitted radiation. On this account, crosstalk, i.e., direct transmission of signals for the transmitting component to the receiving component, can be prevented.

A preferred process for simultaneous production of at least two optoelectronic modules in efficient assembly, in which the radiation focusing device has a support part, on which the beam splitter and transmitting component are attached, in which the support part consists essentially of a material transparent for the emitted radiation and the received radiation, and in which the transmitting component and the radiation focusing device are arranged on opposite sides of the support part, has the following process steps:

a) Production of a wafer, consisting of a material transparent for the emitted radiation and the received radiation, b) Formation or application of at least two radiation focusing devices on a main surface of the wafer, so that an intermediate space is present between two radiation focusing devices, c) Application of a prism bar, in which a beam splitter layer lying along its longitudinal center axis on one of its diagonal planes is embedded, to the wafer so that the beam splitter layer comes to lie above the radiation focusing device;

d) Application of at least two transmitting components to the wafer, so that the transmitting component beam output surfaces of the transmitting components each face a first side surface of the prism bar and a single radiation focusing device is connected to each transmitting component, e) Application of at least two receiving components on the prism bar, so that a single radiation focusing device is connected to each receiving component, f) If prescribed, application of at least two monitor diodes on the wafer, so that one monitor diode is connected to each transmitting component, and g) Serving of the wafer and, optionally, the prism bar in the intermediate space between two radiation focusing devices, so that separate functional units are formed, each of which has a support part, a beam splitter, a transmitting component, a receiving component and a radiation focusing device.

In the interest of completeness, it is mentioned here that simultaneous production of a number of equivalent components in the wafer composite is referred to in semiconductor technology as efficient installation.

Other features which are considered as characteristic for the invention are set forth in the appended claims.

Although the invention is illustrated and described herein as embodied in an optoelectronic module for bidirectional optical data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Identical or functionally equivalent components are identified with the same reference numbers throughout the figures.

Figure 1:
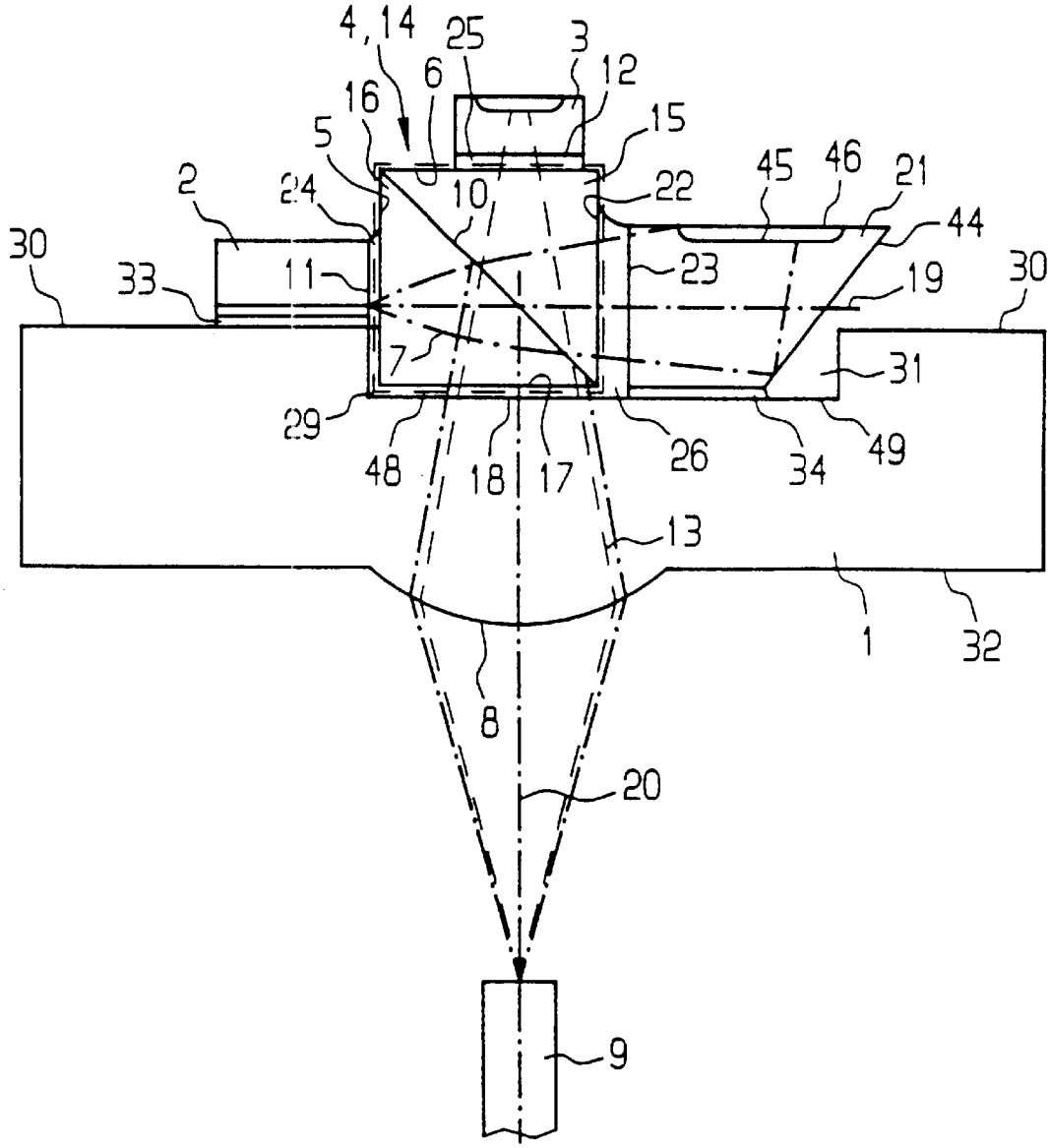
FIG. 1 shows a schematic section of a first exemplary embodiment of the optoelectronic module according to the invention.

Referring now to the figures of the drawing in detail and first, particularly to FIG. 1 thereof, there is seen an optoelectronic module according to the invention. A recess 31 is formed on a first main surface 30 of a support part 1, and a radiation focusing device 8 to focus radiation, in this case, a spherical, convergent lens, is formed on a second main surface 32 of support part 1 opposite the first main surface 30. A prism cube 14 is fastened on the bottom surface 49 of recess 31 by means of a radiation-transparent bonding agent 29, for example, a transparent glue, as beam splitter 4. The prism cube 14 consists of two joined optical prisms 15, 16, between which the beam splitter layer 10 is arranged. The beam splitter layer 10 lies on a diagonal plane of the prism cube 14. This exemplary embodiment is naturally not exclusively restricted to the use of a prism cube 14. A prism cuboid with a square or rectangular plane of section lying perpendicular to beam splitter layer 10 can also be used instead of the prism cube.

Figure 2:
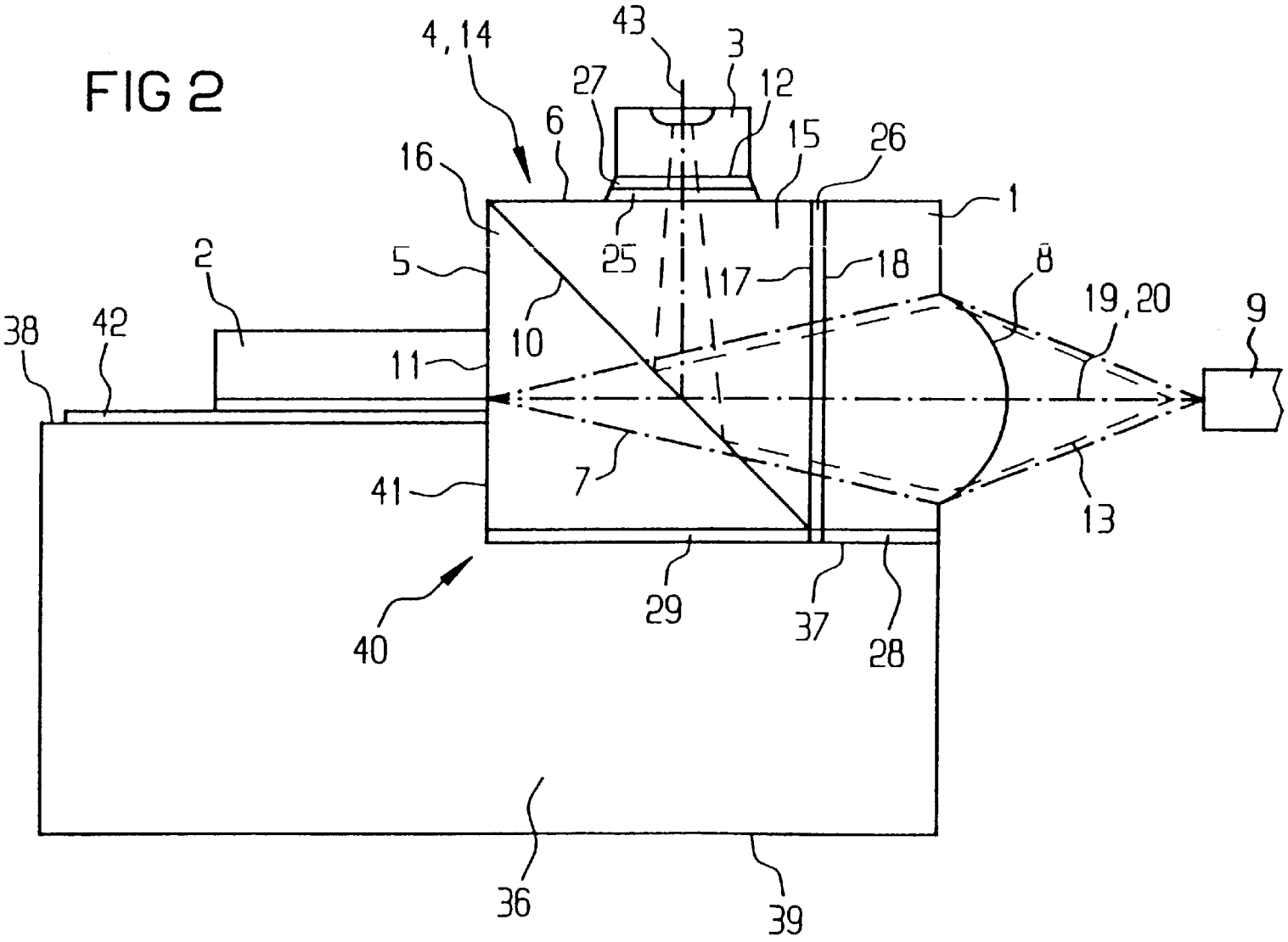
FIG. 2 shows a schematic section of a second exemplary embodiment of an optoelectronic module according to the invention.
Figure 4:
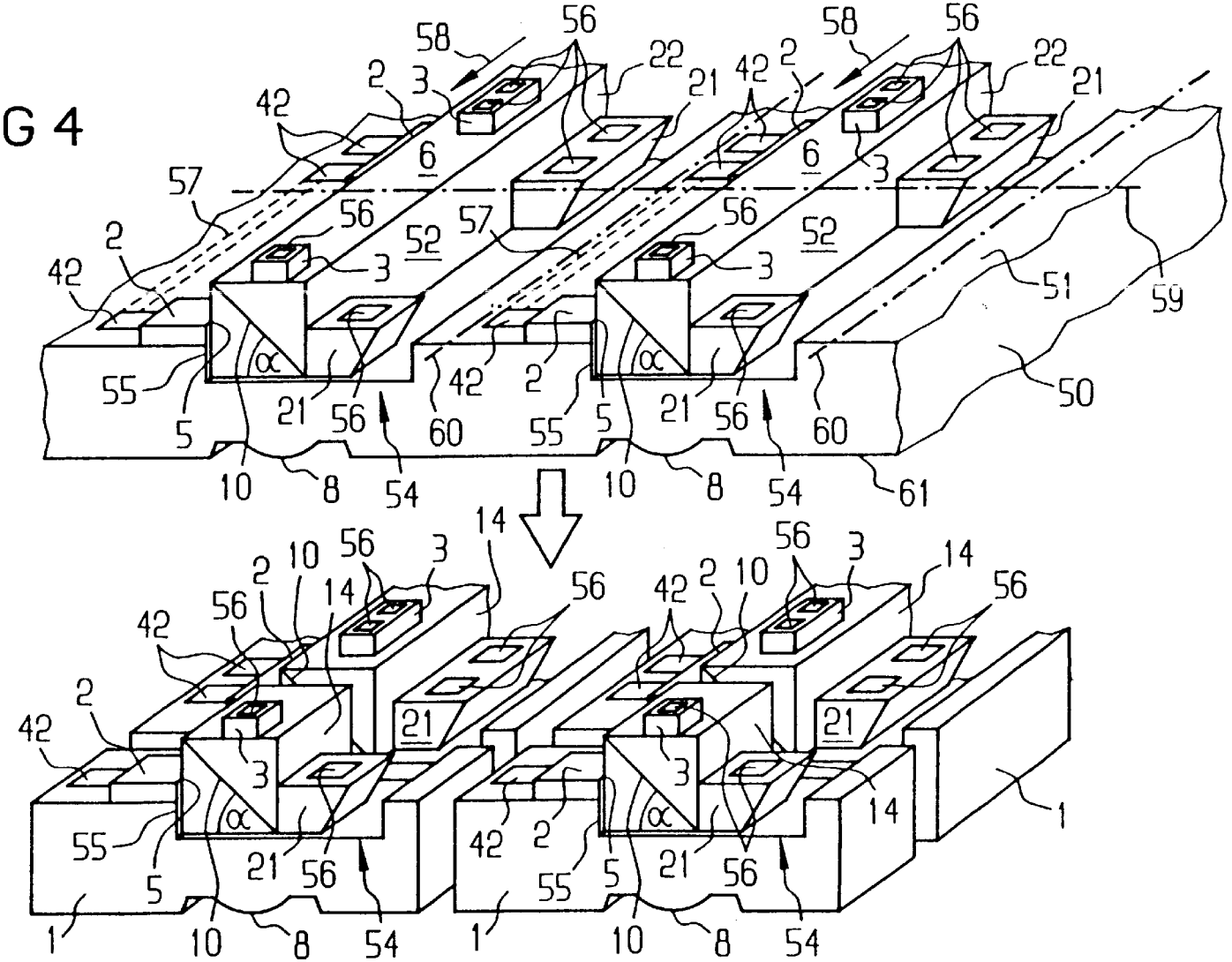
FIG. 4 shows a schematic view to illustrate a process for simultaneous production of a number of optoelectronic modules according to the exemplary embodiment of FIG. 1.

On the first main surface 30 of the support part 1, a transmitting component 2, for example, a Fabry-Perot or DFB laser, i.e., an edge emitter, is fastened adjacent to a first side surface 5 of prism cube 14, so that a transmitting component beam output surface 11 of the transmitting component 2 lies parallel to the first side surface 5 of prism cube 14. A solder or glue is used as bonding agent 33 between the transmitting component 2 and the support part 1. Structured metallization layers 42 are optionally applied on the first main surface 30 of support part 1, as shown in FIGS. 2 and 4, which are connected to electrical terminals of the transmitting component 2 and serve as external electrical terminals for the transmitting component 2. The transmitting component 2, for this purpose, can lie directly with its electrical terminals on the metallization layers 42 and be connected electrically conducting with them by means of a solder.

The transmitting component beam output surface 11 can alternately lie directly on the first side surface 5 of the prism cube, or also be arranged at a spacing from it. In the second case, the intermediate space between the beam output surface 11 and the first side surface 5 of prism cube 14, as shown in FIG. 1, can be filled with a radiation-transparent coupling medium 24, whose refractive index is increased relative to that of air. Because of this, reflection losses can be reduced, owing to the sharply different refractive indices of air and the semiconductor material or the material of the prism cube. Ideally, the transmitting component beam output surface 11 has physical contact with the first side surface 5.

A receiving component 3, for example, a photodiode, is attached by means of a radiation-transparent bonding agent 25 on a second side surface 6 of prism cube 14 lying perpendicular to the first side surface 5 and parallel to the first main surface 30 of the support part 1. The receiving component beam input surface 12 of the receiving component 3 faces the second side surface 6. Ideally, the receiving component beam output surface 12 is again in physical contact with the second side surface 6. The prism cube 14 is arranged so that the beam splitter layer 10 lies in a plane arranged between the transmitting component 2 and the receiving component 3 and includes an angle of 45° with the first main surface 30 of support part 1.

A monitor diode 21 is attached on the side of the prism cube 14 opposite the transmitting component 2 also in recess 31 of support part 1 by means of a bonding agent 34, for example, a metal solder or glue. This monitor device 21 essentially serves to check the radiation 7 emitted from the transmitting component 2 for its wavelength. For this purpose, the beam splitter layer 10 is designed so that it transmits part of the emitted radiation 7.

The monitor diode 21 is arranged so that a monitor diode beam input surface 23 faces a fourth side surface 22 of prism cube 14 opposite the first side surface 5. An intermediate space between the fourth side surface 22 of prism cube 14 and the monitor diode beam input surface 23 is filled by means of a transparent coupling mechanism 26, for example, a transparent epoxy resin. Reflection losses of the radiation on the path to monitor diode 21 can again be reduced because of this.

A side surface 44 of monitor diode 21 opposite the monitor diode beam input surface 23 is beveled so that it reflects at least a part of the radiation penetrating the monitor diode 21 to an pn-junction 45 of monitor diode 21 that detects radiation. It includes an angle smaller than 90°, with a side surface 46 of the monitor diode lying closest to pn-junction 45. In addition, it can be provided with a reflection-increasing layer.

The transmitting component 2, the receiving component 3, the prism cube 14 and the radiation focusing device 8 are designed and arranged so that, during operation of the optoelectronic module, at least part of the radiation 7 emitted from the transmitted component 2, after passing through the radiation 7 focusing device 8, is input coupled in an optical device 9 arranged after the radiation focusing device 8, viewed in the direction of propagation of the emitted radiation 7, and that at least one part of the received radiation 13, output coupled from the optical device 9, after passing through radiation focusing device 8 and through prism cube 14, is input coupled in the receiving component 3.

For this purpose, the prism cube 14 is made from a material transparent for the emitted radiation 7 and the received radiation 13 (for example, sapphire orosilicate glass, sapphire or semiconductor material (cf., for this purpose, the semiconductor materials mentioned below for the support part )). The beam splitter layer 10 is designed so that it mostly reflects the emitted radiation 7 and transmits the received radiation 13 as much as possible. Such beam splitter layers 10 are known in optical engineering, for example, 3 dB splitters or WDM (Wavelength Division Multiplex) filters, and are therefore not further explained here. An antireflection coating 48 (shown with a dashed line) is optionally applied to the side surfaces 5, 6, 17, 22 of the prism cube.

The beam axis 19 of the emitted radiation 7 and the beam axis 20 of the received radiation 13 are perpendicular to each other in the exemplary embodiment.

In the interest of completeness, it is mentioned here that the emitted radiation 7 and the received radiation 13 advantageously have different wavelengths λ. This applies to all exemplary embodiments of the optoelectronic module according to the invention described in this application.

The optical device 9 is, for example, as shown in FIG. 1, an optical waveguide, a lens arrangement or another optoelectronic module, etc.

The support part 1, including the radiation focusing device 8, consists of a material that is also transparent for both the emitted radiation 7 and for the received radiation 13. Glass, plastic, sapphire, diamond or a semiconductor material that is transparent for the emitted radiation 7 and for the received radiation 13 is suitable for this purpose. For wavelengths λ>400 nm, SiC can be used in this respect, for λ>550 nm, GaP, for λ>900 nm, GaAs and for λ>1100 nm, silicon.

The radiation focusing device 8 can be a convergent lens with a spherical or aspherical surface, produced by means of etching or grinding. A diffractive optical element, a holographic optical element or a Fresnel lens, produced by etching, grinding or milling, can also be used as radiation focusing device 8. The recess 31 is produced, for example, by etching or milling.

The recess 31 can be made alternately by means of two separately produced molded elements that are attached to each other on the support part 1 with a spacing. The radiation focusing device 8 can also be produced separately as an alternative to that just described and attached on support part 1 by means of a radiation-transparent solder or glue. If the support part 1 consists, for example, of silicon, and the radiation focusing device 8 consists of glass, these two components can also be joined by anodic bonding.

Figure 3:
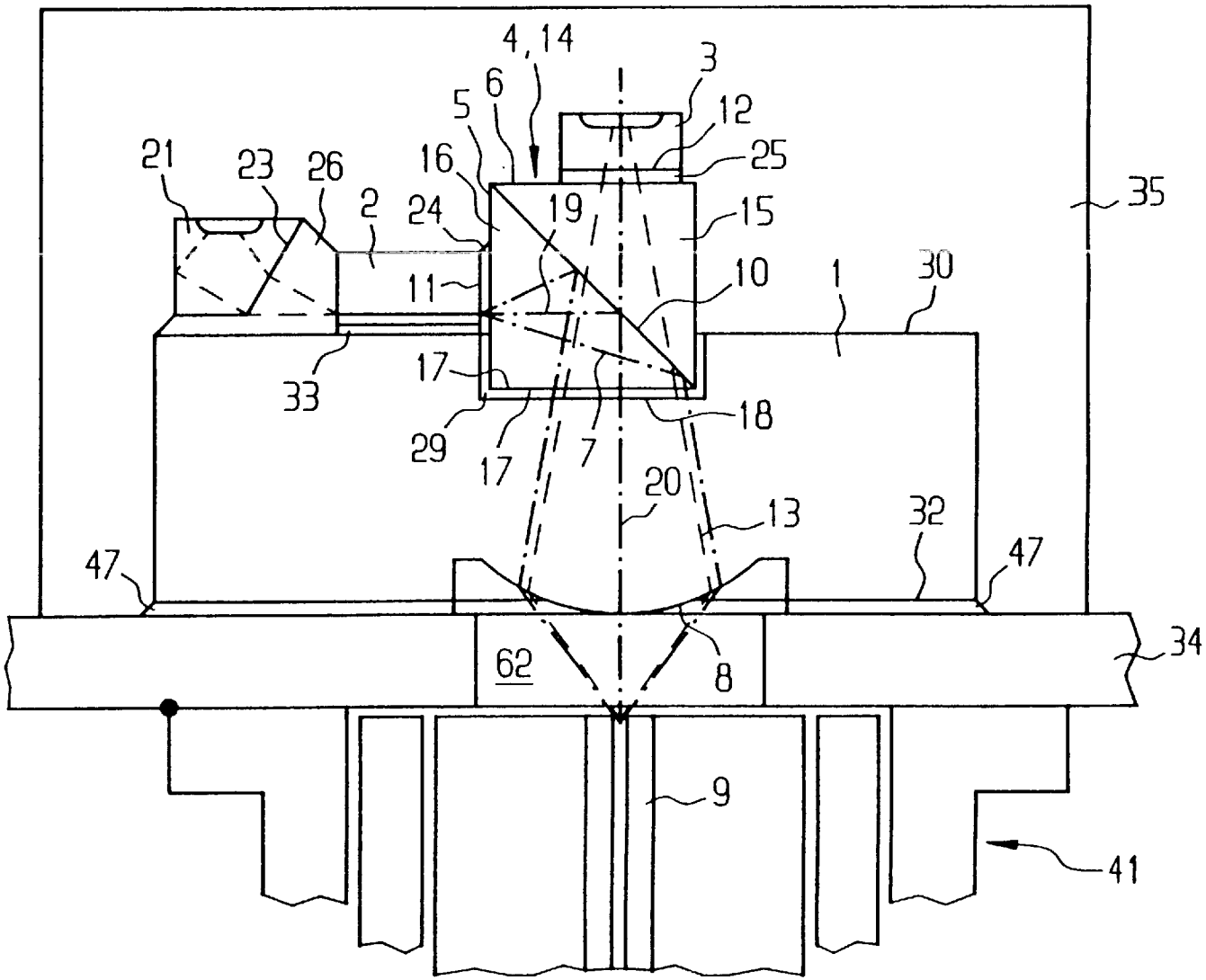
FIG. 3 shows a schematic section through a third exemplary embodiment of an optoelectronic module according to the invention.

In order to protect, if necessary, the active components of the optoelectronic module, i.e., the transmitting component 2, the receiving component 3, and the monitor diode 21 from environmental effects, the entire functional unit, consisting of these three components, and the prism cube 14, as shown in FIG. 3, can be cast with a cast enclosure 35, consisting essentially of plastic or another casting material, for example, an epoxy resin or another appropriate plastic. The optoelectronic module according to the invention can also have a hermetically sealed metal housing with an optical window.

The exemplary embodiment shown in FIG. 2 of the optoelectronic module according to the invention differs from the exemplary embodiment according to FIG. 1, especially in that the radiation focusing device 8 is arranged on the side of the prism cube 14 opposite the transmitting component 2, and that the beam splitter layer 10 is designed so that it transmits most of the emitted radiation 7 and reflects most of the received radiation 13. The beam axis 19 of the emitted radiation 7 and the beam axis 20 of the received radiation 13 run parallel to each other, in particular, lie on each other. The beam axis 43 of the part of the received radiation 13 reflected on the beam splitter layer 10 is perpendicular to the beam axis 19 of the received radiation 13.

The transmitting component 2, the prism cube 14 and the radiation focusing device 8 are attached to a common support element 36 that consists essentially of silicon by means of gluing or soldering. The support element 36 has a step 40 that separates a first installation surface 37 and a second installation surface 38 lying parallel to this.

The prism cube 14 is attached on the first installation surface 37 adjacent to a shoulder surface 41 of step 40 perpendicular to the installation surfaces 37, 38. The bonding agent 29 used for this purpose need not be radiation-transparent. The radiation focusing device 8 is also attached on the first installation surface 37 by means of a bonding agent 28, so that its beam input and beam output surface 18 lies parallel to the third side surface 17 of prism cube 14 and faces it. In this exemplary embodiment a gap filled with a transparent coupling medium 26, for example, synthetic resin, is present between the radiation focusing device 8 and the prism cube 14. The radiation focusing device 8 can naturally also have physical contact with the prism cube 14, especially lie directly on it.

The transmitting component 2 is mounted on the second installation surface 38, so that the beam output surface 11 faces prism cube 14 and lies directly on its first side surface 5. As in the exemplary embodiment of FIG. 1, a gap filled with a transparent coupling medium 24, for example, synthetic resin, for reduction of reflection can naturally also be present between the transmitting component 2 and the prism cube 14, or physical contact can exist.

Metallization layers 42 are applied to the second installation surface 38. These are connected electrically conducting to electrical contacts of the transmitting component 2. For this purpose, the transmitting component 2 and the metallization layers 42 are designed so that electrical contacts of the transmitting component 2 and the metallization layers 42 lie on each other and are connected to each other by means of a metal solder or by means of an electrically conducting glue. The metallization layers 42 simultaneously serve as external electrical terminals for the transmitting component 2, which are connected, for example, by means of bond wires, to a lead frame. Electrical contacts of the transmitting component 2 can naturally also be connected by means of bond wires to the metallization layers 42 or directly to a lead frame. The same applies to the exemplary embodiment of FIG. 1. There, too, corresponding metallization layers 42 are provided on the support part 1.

Moreover, in the exemplary embodiment of FIG. 2 a barrier filter 27 is arranged between the receiving component 3 arranged on the prism cube 14 and the prism cube 14, which is essentially nontransparent for the wavelength of the emitted radiation 7. Because of this, crosstalk attenuation of the optoelectronic module can be reduced. "Crosstalk" is understood to mean direct transmission of signals emitted by the transmitting component 2 to the receiving component 3. The barrier filter 27 can optionally be applied on the receiving component beam input surface 12 or on the second side surface 6 of prism cube 14. In addition, if necessary for optical reasons, a convergent lens can be arranged between the receiving component beam input surface 12 and the prism cube 14.

If a laser diode is used as transmitting component 2, this can be mounted with the active side up (upside up) or with the active zone down (upside down), i.e., in the direction of support element 36. In the second case, the thickness of the laser diode substrate must be adjusted very precisely to the position of the beam splitter layer 10. This is connected with high assembly and adjustment expense. In the first case, on the other hand, only the thickness of the expitaxial layer of the laser diode and the thickness of the optionally present electrical connection metallization layers 42 on the support element 36 enter into consideration. Manufacturing tolerances can be very simply kept within the micrometer range and below. Adjustment is therefore significantly simplified. The same naturally applies for the aforementioned exemplary embodiment of FIG. 1.

If a monitor diode 21 is also prescribed in this exemplary embodiment, this can be arranged behind the transmitting component 2 on the second installation surface 38, viewed from the prism cube 14, as in the exemplary embodiment of FIG. 3. One part of the radiation generated in the transmitting component 2 must then naturally be output coupled rearward, which is connected with a deterioration in laser parameters when a laser diode is used as transmitting component 2, since the rear resonator mirror must also be designed to be partially transparent. The exemplary embodiment of FIG. 1 does not exhibit this drawback; the rear mirror of a laser diode used as transmitting component 2 here can be laid out for high reflection.

In the exemplary embodiment of FIG. 3, which differs from the exemplary embodiment of FIG. 1 in that the monitor diode 21 is situated behind the transmitting component 2, viewed from the prism cube 14, the support part 1 is attached to the individual parts mounted on it by means of a bonding agent 47 (for example, solder or glue) on a support plate 34, so that the second main surface 32 of the support part 1 faces support plate 34.

The support plate 34 is a mounting plate of a Cu-lead frame and has a hole 62, above or in which the radiation focusing device 8 is arranged. An optical waveguide connection device 41, with an optical waveguide as optical device 9, is arranged on the side of support plate 34 opposite support part 1, which is attached, for example, by means of welding, soldering or gluing to support plate 34. The optical waveguide is arranged above hole 62, so that the emitted radiation 7 is focused by the radiation focusing device 8 essentially on the end surface of the optical waveguide.

In order to protect the active components of the optoelectronic module, i.e., the transmitting component 2, the receiving component 3, and the monitor diode 21, from environmental effects, the functional unit having all three of these components and the prism cube 14 is cast with a cast enclosure 35 that consists essentially of epoxy resin or another appropriate plastic. This type of optoelectronic module represents a very simple variant of a bidirectional transmitting and receiving module for optical message transmission by means of a single optical waveguide. Naturally, a hermetically sealed metal housing with an optical window can be used for high mechanical and thermal stress as an alternative to cast enclosure 35.

The housing, consisting of the cast enclosure 35 and the support plate 34, can advantageously be designed by means of appropriate shaping of electrical terminal pins, enclosed partially by the cast enclosure 35, in a simple fashion as an SMD component. Very simple standard surface assembly of the optoelectronic module according to the invention on a circuit board is possible on this account. If necessary, additional electronic components can be contained in the housing, like a preamplifier for the photodiode, laser driver, etc.

Naturally, in similar fashion to the previously described exemplary embodiments of FIGS. 1 and 2, the corresponding functional unit can be attached to a support plate and provided with a cast enclosure 35.

In the schematically depicted process for simultaneous production of a number of optoelectronic modules according to the invention in FIG. 4, according to the exemplary embodiment of FIG. 1, a number of rectangular grooves 54, running parallel to each other at a spacing, are made on a first main surface 30 of a wafer 50. The section of wafer 50 depicted in FIG. 4 has four functional units, in which the two front ones are shown in section.

A number of radiation focusing devices 8 are formed according to a stipulated pattern on a second main surface 61 of wafer 50 opposite the first main surface 51. In this case, these are spherical or aspherical lenses produced by etching or grinding. The radiation focusing devices 8 are arranged in rows, which are opposite the parallel running grooves 54 and perpendicular to them. The wafer 50 consists of a material transparent for the emitted radiation 7 and the received radiation 13. For this purpose, see the description for FIG. 1.

A prism bar 52 with a square cross section is fastened in each groove 54 adjacent to a first groove side surface 55. The first groove side surface 55 can serve here as adjustment reference surface for a first side surface 5 of prism bar 52. Each prism bar 52 has a beam splitter layer 10, which lies on a plane of section of prism bar 52 parallel diagonal to its longitudinal center axis. The angle a between the beam splitter layer 10 and the first main surface 51 of wafer 50 is therefore 45°.

If the prism bar 52 consists of glass and the wafer 50 consists of α-silicon or vice versa, anodic bonding can be used to attach the prism bar 52 to wafer 50, instead of the aforementioned bonding by means of a bonding agent 29. In this technique, the surfaces being joined are placed on each other, heated to about 450° C. and a voltage of about −1000 V applied between the glass and silicon. This joining technique is also possible when the wafer 50 also consists of glass or any other material and has an α-silicon layer on the bonding site to the prism bar 52. Only a glass and an α-silicon layer must lie on each other.

A number of transmitting components 2 are attached on the first main surface 51 of the wafer 50 adjacent to the first side surface 5, so that electrical contacts of the transmitter component 2 come to lie on the metallization layers 42, provided for this purpose and applied to the first main surface 51 of wafer 50, and are connected electrically conducting to them. The side surface 5 here can serve as adjustment reference surface for the transmitting component 2. The transmitting components 2 are arranged so that a radiation focusing device 8 is allocated to each one.

In order to guarantee reliable separation of p- and n-contacts of laser diode transmitting components or to avoid damage to the ridge during use of lasers with ridged waveguides (MCRW laser), a separation groove is formed, for example, etched in, between the metallization layers 42 before installation of the transmitting components 2.

A number of receiving components 3 with electrical contacts 56 are attached on the second side surfaces 6 of the prism bar 52. These are also arranged so that a radiation focusing device 8 is allocated to each one.

In similar fashion to this, a number of monitor diodes 21 with electrical contacts 56 are attached adjacent to a fourth side surface 22 opposite the first side surface 5 in groove 54.

During use of laser diodes as transmitting components 2, these can be interconnected in series by means of metallization paths 57 (shown with dashed lines in FIG. 4) on the first main surface 51 of wafer 50, so that for so-called burn-in of the laser diodes, only the two outer contact surfaces 42 arranged on the two ends of individual laser diode lines 58 must be contacted. The burn-in for the laser diodes allocated to the same laser diode lines 58 can therefore be carried out simultaneously in simple fashion. Moreover, the individual transmitting components 2 and receiving components 3 can be measured for their electrooptical parameters by contacting of the corresponding metallization layers 42, 56 and connection to an appropriate wafer tester in the wafer composite, i.e., advantageously. The same naturally applies to the monitor diodes 21.

After these process steps, the wafer 50 and the prism bars 52 are then served along first separation lines 59 that run between the individual transmitting components 2 perpendicular to grooves 54 and the wafer 50 along second separation lines 60 that run between two grooves 54. The individual devices, each one having transmitting component 2, one receiving component 3, one monitor diode 21, a prism cuboid 14 and a radiation focusing device 8 with support part 1, are then further processed according to the prescribed area of use, for example, attached to a lead frame and provided with a cast enclosure 35.

The process just described can naturally be used with slight modifications for the two additional exemplary embodiments of FIGS. 2 and 3. It permits cost-effective production with a simultaneously high yield in assembly and 100% testing in all important operating parameters of the optoelectronic module efficiently, i.e., in the wafer composite.

What is claimed is:

1. An optoelectronic module for bidirectional optical data transmission, comprising:

a transmitting component with a beam output surface for emitting radiation;

a receiving component with a beam input surface for receiving radiation;

a beam splitter with a beam splitter layer and a radiation focusing device having a beam input and beam output surface, said beam splitter being a molded element consisting essentially of a material transparent to emitted radiation emitted by said transmitting component and to received radiation to be received in said receiving component, and said beam splitter layer being embedded in said molded element so as to intersect a beam axis defined by the emitted radiation and a beam axis defined by the received radiation;

said molded element having a first side surface, a second side surface inclined relative to said first side surface, and a third side surface inclined relative to one of said first side surface and said second side surface;

said molded element having mutually opposite side surfaces formed by said first side surface and said third side surface or said second side surface and said third side surface, respectively;

said beam output surface of said transmitting component facing and being connected to said first side surface, said beam input surface of said receiving component facing and being connected to said second side surface, and said beam input and beam output surface of said radiation focusing device facing and being connected to said third side surface; and said transmitting component, said receiving component, said beam splitter and said focusing device being arranged relative to one another, so as to enable the optoelectronic module, during an operation thereof, to output at least a portion of the emitted radiation to an optical device optically coupled to the optoelectronic module, and at least a portion of the received radiation to be input from the optical device and into said receiving component.

2. The optoelectronic module according to claim 1, wherein said molded element comprises two mutually joined optical prisms, and said beam splitter layer is arranged between said two optical prisms.

3. The optoelectronic module according to claim 1, wherein said molded element is cuboid element, said beam splitter layer lies in a diagonal sectional plane through said cuboid element, and a sectional plane through said cuboid element perpendicular to said beam splitter layer has a rectangular shape.

4. The optoelectronic module according to claim 3, wherein said sectional plane through said cuboid element perpendicular to said beam splitter layer has a square shape.

5. The optoelectronic module according to claim 1, wherein said first side surface and said second side surface are perpendicular to one another, said third side surface and said second side surface are perpendicular to one another, and said opposite side surfaces of said molded element are parallel to each other.

6. The optoelectronic module according to claim 1, wherein said first side surface and said second side surface are perpendicular to one another, said third side surface and said first side surface are perpendicular to one another, and said opposite side surfaces of said molded element are parallel to one another.

7. The optoelectronic module according to claim 1, wherein said radiation focusing device includes a support part connected to said molded element by means of a radiation-transparent bonding agent, said support part consisting essentially of a material transparent to the emitted radiation and to the received radiation, and said transmitting component and the optical device are disposed on mutually opposite sides of said support part.

8. The optoelectronic module according to claim 7, wherein said transmitting component is attached to said support part.

9. The optoelectronic module according to claim 8, wherein said support part is integrally formed in one piece with said radiation focusing device.

10. The optoelectronic module according to claim 1, wherein said molded element has a fourth side surface, and including a monitor diode having a monitor diode beam input surface facing said fourth side surface, and wherein said beam splitter layer is partially transparent to the emitted radiation such that a first portion of the emitted radiation encounters said monitor diode beam input surface.

11. The optoelectronic module according to claim 1, wherein the beam axis of the emitted radiation and the beam axis of the received radiation are substantially parallel, said beam splitter layer transmits a portion of the emitted radiation being coupled into the optical device and largely reflects the received radiation and diverts the received radiation to said receiving component, and said radiation focusing device and said transmitting component are disposed on mutually opposite sides of said molded element.

12. The optoelectronic module according to claim 1, wherein the beam axis of the emitted radiation and the beam axis of the received radiation enclose an angle of 90°, said beam splitter layer mostly reflects the emitted radiation such that the beam axis of the reflected radiation runs parallel to the beam axis of the received radiation, and said beam splitter layer transmits at least a portion of the received radiation to be input into said receiving component beam input surface.

13. The optoelectronic module according to claim 1, which further comprises a barrier filter largely nontransparent to a wavelength of the emitted radiation disposed between said receiving component and said second side surface of said molded element.

14. A method of simultaneously producing at least two optoelectronic modules according to claim 7, which comprises the following steps:

producing a wafer consisting of a material transparent to the emitted radiation and to the received radiation and having a main surface;

providing at least two radiation focusing devices on the main surface of the wafer, while maintaining an intermediate space between the two radiation focusing devices;

placing at least one prism bar, having diagonal planes and a beam splitter layer on one of the diagonal planes embedded along a longitudinal center axis, onto the wafer such that the beam splitter layer comes to lie above the radiation focusing devices;

applying at least two transmitting components to the wafer such that beam output surfaces of the transmitting component face a first side surface of the prism bar, and assigning a single radiation focusing device to each of the transmitting components;

applying at least two receiving components to the prism bar and assigning a single radiation focusing device to each of the receiving components; and dicing the wafer by severing along the intermediate space between two radiation focusing devices and forming separate functional units each having a support part, a beam splitter, a transmitting component, a receiving component, and a radiation focusing device.

15. The method according to claim 14, wherein the dicing step comprises serving the prism bar together with the wafer.

16. A method of simultaneously producing at least two optoelectronic modules according to claim 10, which comprises the following steps:

producing a wafer consisting of a material transparent to the emitted radiation and to the received radiation and having a main surface;

providing at least two radiation focusing devices on the main surface of the wafer, while maintaining an intermediate space between the two radiation focusing devices;

placing at least one prism bar, having diagonal planes and a beam splitter layer on one of the diagonal planes embedded along a longitudinal center axis, onto the wafer such that the beam splitter layer comes to lie above the radiation focusing devices;

applying at least two transmitting components to the wafer such that beam output surfaces of the transmitting component face a first side surface of the prism bar, and assigning a single radiation focusing device to each of the transmitting components;

applying at least two receiving components to the prism bar and assigning a single radiation focusing device to each of the receiving components; and dicing the wafer by severing along the intermediate space between two radiation focusing devices and forming separate functional units each having a support part, a beam splitter, a transmitting component, a receiving component, and a radiation focusing device.

17. The method according to claim 16, wherein the dicing step comprises severing the prism bar together with the wafer.

* * * * *